(12) United States Patent
Herring et al.

(10) Patent No.: US 7,607,449 B2
(45) Date of Patent: Oct. 27, 2009

(54) MIXER TAP

(75) Inventors: William Peter Herring, Bath (GB); James Moore, Frome (GB)

(73) Assignee: Hornbeam Ivy Limited, Somerset (GB)

( * ) Notice: Subject to any disclaimer, the term of this patent is extended or adjusted under 35 U.S.C. 154(b) by 675 days.

(21) Appl. No.: 11/496,505

(22) Filed: Aug. 1, 2006

(65) Prior Publication Data

US 2007/0028974 A1 Feb. 8, 2007

(30) Foreign Application Priority Data

Aug. 8, 2005 (GB) ................... 0516264.9

(51) Int. Cl.
*F16K 11/18* (2006.01)
(52) U.S. Cl. ................. 137/15.18; 137/636; 137/636.4; 137/625.17; 137/625.4
(58) Field of Classification Search ............ 137/636, 137/636.4, 625.4, 625.41, 625.17, 15.18
See application file for complete search history.

(56) References Cited

U.S. PATENT DOCUMENTS

| | | | | |
|---|---|---|---|---|
| 2,878,489 A | * | 3/1959 | Graham | ................ 137/636 |
| 4,653,538 A | * | 3/1987 | Tsutsui et al. | ........ 137/625.46 |
| 4,966,191 A | * | 10/1990 | Azizi | .............. 137/625.17 |
| 5,349,987 A | | 9/1994 | Shieh | |
| 5,417,348 A | | 5/1995 | Perrin et al. | |
| 5,806,771 A | | 9/1998 | Loschelder et al. | |
| 5,906,319 A | | 5/1999 | Crowl | |
| 6,058,972 A | * | 5/2000 | Kahle et al. | ............ 137/625.4 |
| 6,119,947 A | | 9/2000 | Couture et al. | |
| 6,341,617 B1 | | 1/2002 | Wilson | |
| 6,641,061 B1 | | 11/2003 | Hsieh | |
| 7,240,850 B2 | * | 7/2007 | Beck et al. | ............ 137/625.4 |
| 2002/0162586 A1 | | 11/2002 | Perrin | |
| 2003/0001028 A1 | | 1/2003 | Brattoli et al. | |
| 2004/0123910 A1 | | 7/2004 | Yardley | |
| 2004/0226088 A1 | | 11/2004 | Ouyoung | |

FOREIGN PATENT DOCUMENTS

EP 1350573 A1 10/2003

* cited by examiner

*Primary Examiner*—Kevin L Lee
(74) *Attorney, Agent, or Firm*—Stites & Harbison PLLC; Ross F. Hunt, Jr.

(57) ABSTRACT

A mixer tap assembly is shown which has a mixing chamber for mixing fluids from two inputs, and a mix controller to control the ratio of fluid flow into the mixing chamber from the inputs. The mix controller includes a mix actuator which operates a mix control apparatus, such as a rotatable sleeve, which is connected to a mix valve apparatus associated with the mixing chamber. The mix actuator and a fluid outlet are mountable on or above a work surface via a mounting apparatus, while the mixing chamber is mountable below the work surface. Furthermore, the mix control apparatus and an output conduit, between the fluid outlet and the mixing chamber, pass through a bore in the mounting means, so minimizing the footprint of the mixer tap assembly on the work surface.

25 Claims, 9 Drawing Sheets

MIXER TAP

BACKGROUND OF THE INVENTION

1. Field of the Invention

The present invention relates to mixer taps, i.e. taps with a plurality of fluid inputs which are mixable to be ejected from one or more common outputs. For example, mixer taps are used on kitchen sinks to provide a single water supply with controllable temperature. The present invention is applicable to mixer taps having a pull-out or pull-down spray facility, i.e. where the or an additional fluid outlet is detachable from the main unit to give flexible user-directable flow.

2. Summary of the Prior Art

Mixer taps are well known. Typically, fluid input from a plurality of sources (usually hot and cold water supplies) is controllably conveyed to a mixing chamber, where the fluid is mixed and ejected through an output spout. Such mixer taps commonly use a single lever mixing valve to control the flow rate and temperature of the ejected water. Temperature is controlled by adjusting the ratio of hot to cold inputs received in the mixing chamber. A single lever mixing valve can control these two properties using a combination of rotational and tilting movements of an actuator operably connected to the control lever of the mixing valve. For example, the actuator (e.g. tap head) may be rotated to control temperature and tilted to control flow rate. This is conventional.

To give greater flexibility it is increasingly common to combine a side spray unit with the main mixer tap. Previously, separate side sprays were used, but when used with mixer taps these suffered from problems in efficiently delivering mixed water from the mixing chamber to the side spray. For example, one proposal incorporated an automatic diverter valve in the mixer tap to deflect water to a side spray when the side spray was operated. To fit in the mixer tap, the diverter valve was small, which meant that in time it was liable to become clogged with limescale and therefore reduce flow to the spray. By combining the side spray unit with the main tap, the problems caused by the diverter valve could be avoided.

In one combined proposal (known as a pull-out spray), a spray head is removably attached to the side of the tap beneath the mixing valve with a hose connecting the spray head to the valve. In another combined proposal (known as a pull-down spray), the main tap spout has a traditional goose neck configuration through which the tube that feeds the spray nozzle passes. The spray nozzle is removably attached to the mouth of the spout; when attached it operates as the main tap outlet, when detached (pulled down) it operates as a hand spray. Typically the connecting hose is longer than the spout to give flexibility of movement.

SUMMARY OF THE INVENTION

Combined arrangements of the sort described above often require large housings to contain the components. For example, it can be necessary for the tap housing to contain the valve apparatus and mixing chamber. Such large housings can be undesirable as they take up space and may not be aesthetically pleasing. Usually, the excess hose is looped under the work surface to stay out of sight. Thus, space must be made for the connecting hose to pass through the work surface twice, as well as to allow for the input supplies to the mixing chamber. This may give the tap assembly a large footprint on the work surface.

The present invention aims to address the problems mentioned above. At its most general, the invention provides a mixer tap assembly with a control mechanism for controlling input to and output from a mixing chamber where the control mechanism includes means for communicating through a work surface via the same path as an output fluid flow to allow components of the assembly such as the mixing chamber to be located below the work surface. Accordingly, the size of that part of the assembly to be mounted on or above the work surface, e.g. in view of the user during normal use, can be kept small and/or made more aesthetically pleasing.

There are many ways of controlling the output from the mixing chamber. One way is to indirectly control the output by controlling the input into the mixing chamber. Another way is to have separate control means for controlling the output independently of control of the input.

It is to be noted that the terms "above" and "below" as used hereafter refer to positions of elements relative to each other, and of course do not limit the components of the invention to a particular orientation relative to the earth.

Thus, in one aspect the present invention may provide a mixer tap assembly having:

a mixing chamber mountable below a work surface for mixing fluid receivable from two inputs which are in fluid communication with the mixing chamber;

a fluid outlet mountable on or above the work surface;

an output conduit in fluid communication with the mixing chamber to carry mixed fluid to the fluid outlet;

a flow controller operable to control fluid flow out of the mixing chamber into the output conduit; and a mix controller operable to control fluid input received in the mixing chamber; wherein:

the flow controller has a flow actuator that is mountable on or above the work surface and arranged to operate flow control means which are communicable with the mixing chamber through the work surface to control fluid flow out of the mixing chamber;

the mix controller has a mix actuator that is mountable on or above the work surface and arranged to operate mix control means which are communicable with the mixing chamber through the work surface to perform the fluid input control; and the flow control means, mix control means and output conduit share a common path through the work surface.

The mounting of components of the assembly above and below the work surface is normally achieved by using mounting means for attaching the assembly to the work surface. The mounting means may be a housing and backing nut on opposite sides of the work surface. The components of the assembly are positioned relatively above or below the mounting means of the assembly and are thus located above or below the work surface when the mounting means is attached to it.

The listed components of the assembly which are adapted to share a common path through the work surface normally do so by passing through a bore in the mounting means. Therefore, the present invention may also provide a mixer tap assembly having:

mounting means for attaching the assembly to a work surface;

a mixing chamber positioned below the mounting means for mixing fluid receivable from two inputs which are in fluid communication with the mixing chamber;

a fluid outlet positioned above the mounting means, which fluid outlet is located at the end of a spout;

an output conduit in fluid communication with the mixing chamber for carrying mixed fluid to the fluid outlet; and a mix controller including mix valve means associated with the mixing chamber, the mix controller being operable to control the ratio of fluid received in the mixing chamber from the two inputs;

wherein the mix controller further includes a mix actuator positioned above the mounting means and arranged to operate mix control means which is communicable with the mix valve means to perform the fluid input control; and wherein the mix control means and the output conduit pass through a bore in the mounting means.

Thus, the mixer tap assembly may be arranged to be mounted in a sink unit, e.g. a kitchen sink, with the mixing chamber under the sink surface, i.e. out of sight during normal use, so that preferably only the fluid outlet, flow actuator and mix actuator are on view.

The output conduit typically travels through a hole formed through the work surface (sink surface). The fluid outlet is preferably mountable over this hole to receive the output conduit.

Preferably, the assembly includes a housing mountable on the work surface. The housing preferably has any one or more or all of the flow actuator, mix actuator and fluid outlet mounted thereon.

Preferably, the fluid outlet is connected to the output conduit. For example, the fluid outlet may be a nozzle, e.g. a spray head nozzle mountable on the housing. The spray head nozzle may be detachable from the housing, e.g. to form a pull-out spray.

Preferably, the tap assembly includes a spout extending from the housing. In one arrangement, the spout may be provided with its own water supply from the mixing chamber. Alternatively, the fluid outlet may be located at, e.g. detachably mountable on, the end of the spout. The spout may form a passageway for the output conduit, so that the fluid outlet (spray head nozzle) is detachable from the end of the spout to form a pull-down spray. In a preferred embodiment, the spout has a goose-neck configuration.

Thus, the present invention is equally applicable to mixer tap assemblies where the spray unit doubles as the main fluid supply (pull-down sprays) and mixer tap assemblies having an independent spray unit and main fluid supply on a common housing.

Preferably, the flow and/or mix control means include a physical connection to the mixing chamber, e.g. directly to control valve or valves at the inputs and/or output of the mixing chamber. In this case, the output conduit and control means may pass through a common hole, e.g. a single hole, in the work surface. The output conduit therefore only passes through the work surface once, thereby reducing the footprint of the tap assembly compared with known devices. The footprint is further reduced by locating the mixing chamber (and hence its inputs) below the work surface.

Preferably, the flow controller is arranged to control fluid flow rate through the output conduit. In other words, it controls the volume of fluid delivered by the tap assembly per unit time. The mixing chamber may include an output valve operable by the flow controller, the output valve being arranged to control the flow rate of fluid out of the mixing chamber into the output conduit. Preferably the flow control means communicates e.g. by physical connection with the output valve.

Preferably, the mix controller is operable to control the relative proportion of fluid from each fluid input that is permitted into the mixing chamber. Preferably, the mix controller controls input to the mixing chamber independently of the flow controller's control of flow output from the mixing chamber.

Preferably, the mixing chamber includes an input valve at each of the two inputs, each input valve being arranged to control the flow rate of fluid from its respective input into the mixing chamber. The two inputs may carry hot and cold water respectively. Preferably, the valves are controlled in a complementary fashion, i.e. varying the relative proportion of fluid from each input while maintaining a constant input flow rate. For example, the input flow rate to the mixing chamber may be kept constant with the mix controller able to cause all of the flow to come from one or other of the inputs or as a mixture of the two. Preferably, the ratio of the mixture is variable in a continuous, e.g. linear, fashion.

Thus, while the flow controller may be operable to allow fluid to flow through the tap assembly, the mix controller may be operable to control the proportions of flow inputs into the mixing chamber, i.e. the mix controller may control the content of the fluid flowing through the tap.

Preferably, the output conduit is a flexible tube extending from the mixing chamber to the housing mounted on the work surface. The housing is preferably located over a hole in the work surface through which the output conduit (flexible tube) passes. As explained above, the output conduit may feed a spray head mounted on the housing or may extend through a main spout to feed a nozzle detachably mounted to the end of the spout. In both cases, it is preferable that the tube is extendable away from the housing, e.g. by being slidable relative to it (i.e. through it). This may be achieved by making the flexible tube longer than is necessary to reach the fluid outlet, with the excess length under the work surface when the tube is in a non-extended position.

Preferably, the flow and/or mix control means include physical connection to the valve or valves (e.g. cartridge valves) associated with the mixing chamber such that operation of the flow and/or mix actuator is directly transferred to operation of the valve or valves. Preferably, the physical connection of the control means extends through the same hole (i.e. the single hole) in the work surface as the output conduit that carries fluid to the fluid outlet. By sharing this space, the number of components on view to the user (i.e. above the work surface) can be kept to a minimum, which may improve the overall appearance of the tap assembly.

In one preferred embodiment, the flow and mix control means are upstanding sleeves rotatable about an axis. The sleeves are preferably operably connected to the valve or valves associated with the mixing chamber. In a most preferred configuration, the upstanding sleeves of the flow and mix control means are coaxial, i.e. concentric. The actuators may be rotatable rings coupled to their respective sleeve, each ring being rotatable by a protruding (e.g. radially protruding) lever. Preferably, the rotation axis of the sleeves is coaxial with the hole in the housing through which the output conduit is arranged to travel. Thus, the output conduit may pass through the actuator sleeves on it route from the mixing chamber below the work surface to the fluid outlet above the work surface.

A longitudinal (axially extending) opening is preferably formed in each sleeve to receive the output conduit. The circumferential extent of the opening is preferably selected to avoid interference with (i.e. constricting movement of or affecting flow through) the output conduit. The axial extent of the opening is preferably selected to avoid excessive bending of the output conduit as it travels through the sleeves and out of the housing.

Thus, the flow rate and mix ratio of fluid output from the tap may be controllable by two rotatable controllers. The rotatable controllers may be located on top of one another to permit easy user access.

Fluid may arrive in the mixing chamber from each input through a respective input cartridge valve, e.g. of the conventional ceramic disc type, with the mix controller arranged to control the cartridge valves. Typically, cartridge valves are operated (turned from off to full on) by rotating a control lever, e.g. through a quarter turn. Preferably, the control means of the mix controller is operably connected to the control levers of its respective cartridge valves. The operative connection may be geared to give the user increased control.

Fluid may exit from the mixing chamber into the output conduit through another cartridge valve, e.g. of the ceramic disc type, with the flow controller arranged to control this cartridge valve, e.g. in a similar way to the mix controller, described above.

The outputs of two input cartridge valves may be directly connected to, i.e. in fluid communication with, the input of an output cartridge valve. Thus, flow rate and mixing ratio of the output fluid flow can be controlled using three cartridge valves.

The flow and mix controllers may be combined. Such a combined mix/flow controller may include a common actuator for operating control means (which may be separate or combined) for controlling fluid input and output to the mixing chamber.

Preferably, the combined mix/flow controller includes both a common actuator and a common control means, thereby reducing the total number of components in the tap. The common actuator may be arranged to cause the common control means to exhibit different types of movement. A different type of movement may be associated with fluid input and output control. For example, the combined actuator may be horizontally rotatable and vertically tiltable.

Different types of movement preferably communicate to the control means which of flow or mix control is to be operated. This communication may be physical. For example, the common control means may be a upstanding sleeve capable of rotational motion about its axis and linear motion along its axis, e.g. up and down.

The sleeve may be operably coupled to a single-lever mixing cartridge, e.g. of the conventional type where output flow rate and input mix proportion are controlled by manipulating a single lever. The movement of the sleeve is therefore preferably translated into movement of the control lever. For example, rotation of the sleeve may cause rotation of the control lever, and up and down movement of the sleeve may cause tilting of the control lever.

Second and third aspects of the invention may provide a tap and work surface assembly, including a mixer tap assembly mounted on a work surface, and a method of assembling the same, respectively.

BRIEF DESCRIPTION OF THE DRAWINGS

Examples of the present invention are discussed in detail with reference to the accompanying drawings, in which.

DETAILED DESCRIPTION

Figure 1:
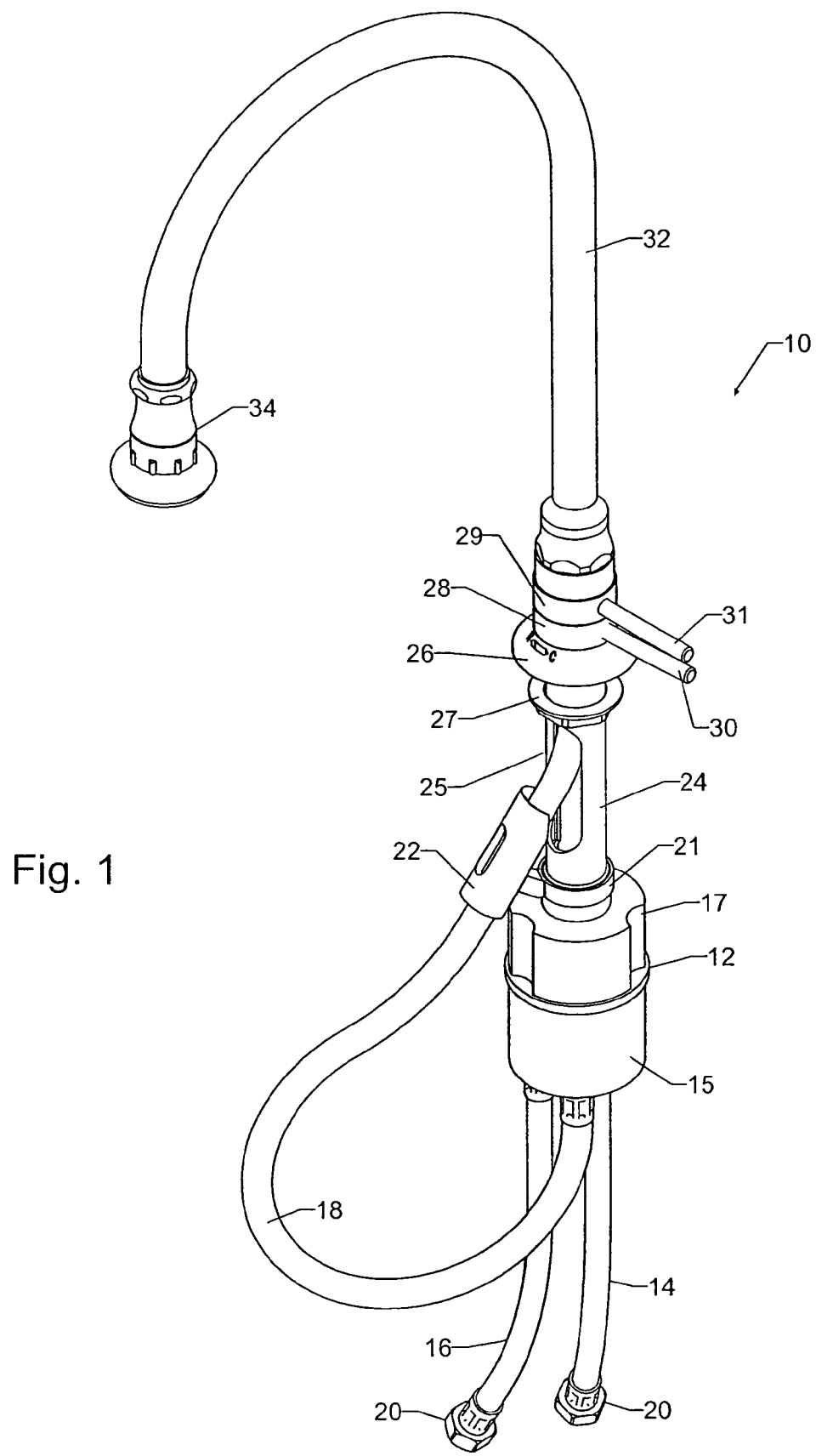
FIG. 1 is a perspective view of a tap assembly according to a first embodiment of the invention.

FIG. 1 shows a tap assembly 10 according to one embodiment of the invention isolated from its mounting position, e.g. next to a sink. The tap assembly 10 has a mixing chamber housing 12 which receives two fluid inputs 14,16 which are connected to hot and cold water supplies (not shown) respectively via connectors 20. The inputs 14,16 feed the base 15 of the mixing chamber housing 12; each input 14,16 supplies its own cartridge valve (not shown) inside the base 15. An output conduit 18 carries mixed fluid away from the mixing chamber housing 12 to a fluid outlet 34 at the end of an output spout 32. The output conduit 18 is a flexible pipe that loops around the bottom of the base 15 and passes through the interior of the output spout 32, which is a hollow rigid pipe made of suitable material (e.g. stainless steel, brass, etc.), arranged in a gooseneck configuration. The output conduit 18 feeds fluid to the fluid outlet 34, which is a conventional spray head. The fluid outlet 34 is detachably mounted to the output spout 32, and can be pulled down, i.e. away from the spout 32, to give the user flexibility in directing flow out of the outlet 34. The output conduit 18 has extra length to accommodate this movement.

Figure 2:
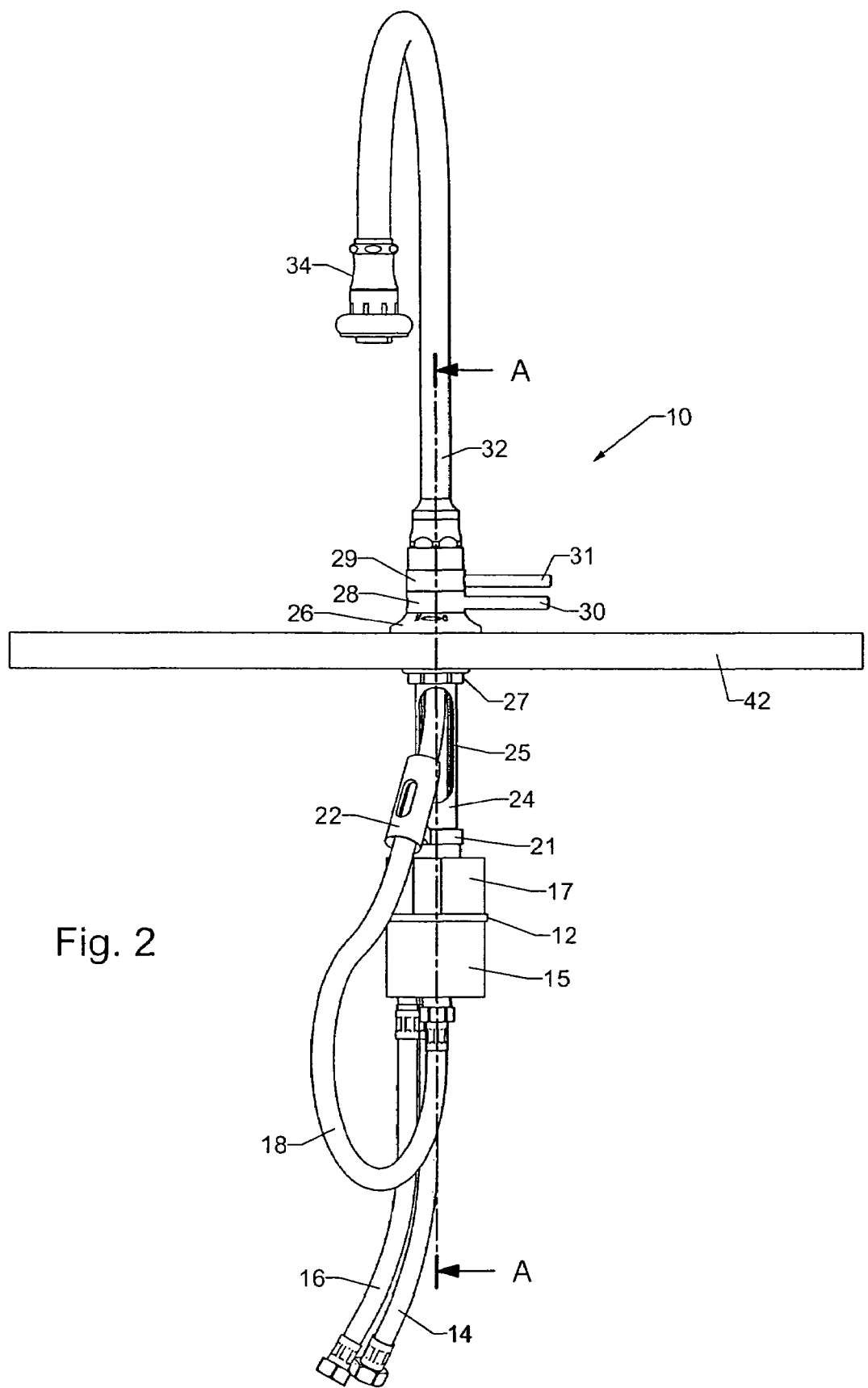
FIG. 2 is a side view of the tap assembly of FIG. 1.

The mixing chamber housing 12 is connected to control housing 26 by an upstanding rigid tube 24. In use, as shown in FIG. 2, the base of control housing 26 rests on the top of a work surface 42, where it is secured in place by a backing nut 27. The upstanding tube 24 extends through a hole (not shown) in the work surface 42 so that the mixing chamber housing 12 and the loop of output conduit 18 are located out of sight below the work surface 42.

Tube 24 is hollow, and control housing 26 has a passageway therethrough to allow the output conduit 18 to travel from below the work surface 42 to the output spout 32 through the same hole in the work surface 42 as the tube 24. The tube 24 has a cut-out opening 25 which allows the output conduit 18 to be fed in below the control housing 26. A guiding tube 22 is attached to a ring 21 mounted on the tube 24 via a lug 23. The guide tube 22 controls the orientation and angle at which the output conduit 18 enters the tube 24. This prevents the edges of the cut-out hole 25 from interfering with the output conduit, and also prevents kinks from forming in the conduit.

Two radially protruding rotatable push levers 30,31 are mounted in the control housing 26 to communicate with the valves in the mixing chamber housing 12 as described below. The levers 30,31 rotate about a vertical axis extending through the tube 24. The levers 30,31 are located on top of one another, and their connections in the housing are covered by respective trim covers 28,29. The upper lever 31 is arranged to control flow rate (output volume), whereas the lower lever 30 is arranged to control mix ratio, i.e. the relative proportion of fluid received from inputs 14,16.

Figure 3:
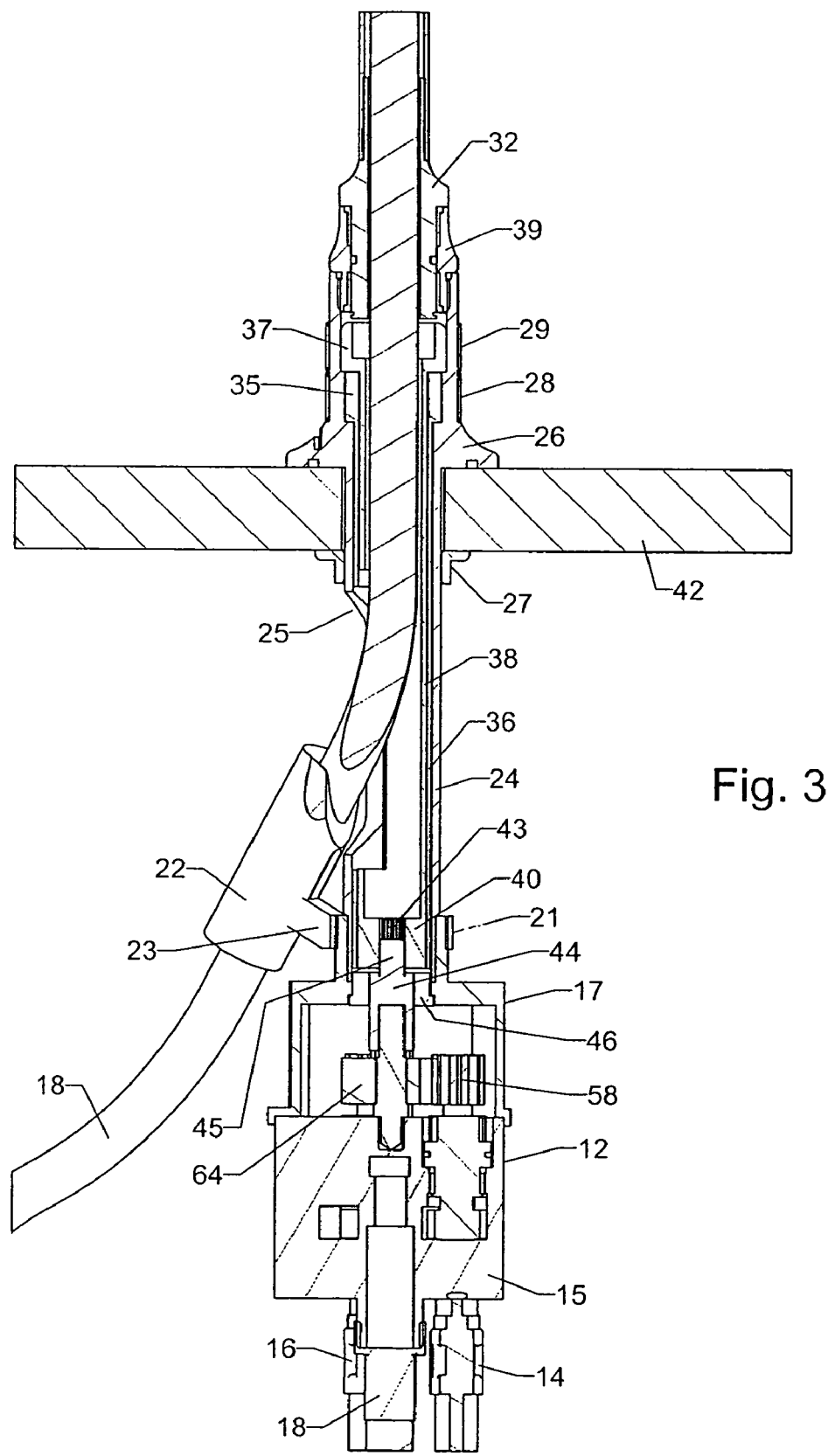
FIG. 3 is a cross-section taken along the line A-A in FIG. 2.

FIG. 3 shows the mechanism by which the levers 30,31 communicate with the valves in the mixing chamber housing 12. Lower lever 30 is operably coupled to the head 35 of an upstanding rotatable sleeve 36. The base of sleeve 36 is connected to a annular block 46, which has a depending lug 55 connected to a set of radially protruding teeth 64, which are arranged to engage gears 58,60 associated with valve cartridges 52,54 for controlling the input mix ratio of fluid from inputs 14,16 (see FIGS. 4 and 5).

Similarly, upper lever 31 is operably coupled to the head 37 of another upstanding sleeve 38 which lies inside and coaxial with sleeve 36 and tube 24. The base 40 of sleeve 38 has a splined through hole 43 bored therein which receives a correspondingly splined projection 45 from coupling block 44. Rotation of the sleeve 38 causes coupling block 44 to rotate. Coupling block 44 extends through annular block 46 and terminates in another set of radially protruding teeth 62 arranged to engage a gear 56 to operate a cartridge valve 50 associated with output flow rate (see FIG. 4).

The valve cartridges 50,52,54 are housed in the base 15 of the mixing chamber housing 12. A casing 17 attaches the base 15 to the tube 24 to prevent relative rotation therebetween, i.e. so that operating the levers 30,31 does not cause the entire mixing chamber housing 12 to rotate. Additionally, the cover 17 protects the gear connections, which protrude from the top of the base 15.

The rotatable sleeves 36,38, which act as physical control means that connect user operations above the work surface 42 to the control of valves below the work surface 42, also have cut-out openings along their length to overlap with the cut-out opening in tube 24. To allow for the rotation of the sleeves 36,38, their cut-out openings have a wider circumferential extent. This means that they do not interfere with the output conduit 18, even when rotated to control the cartridge valve (s).

Figure 4:
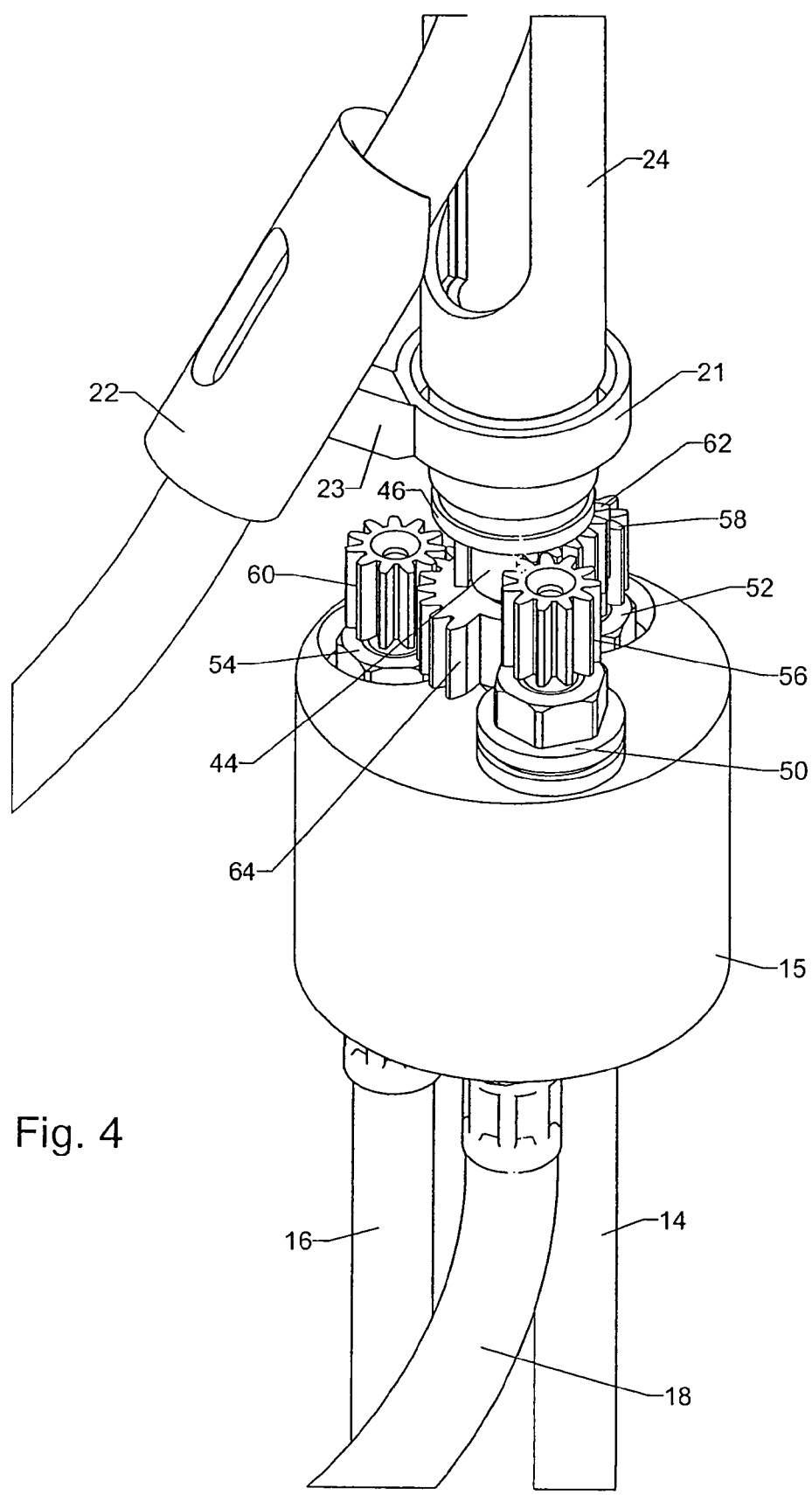
FIG. 4 is a close-up perspective view of the interior of the mixing chamber housing shown in FIG. 1.
Figure 5:
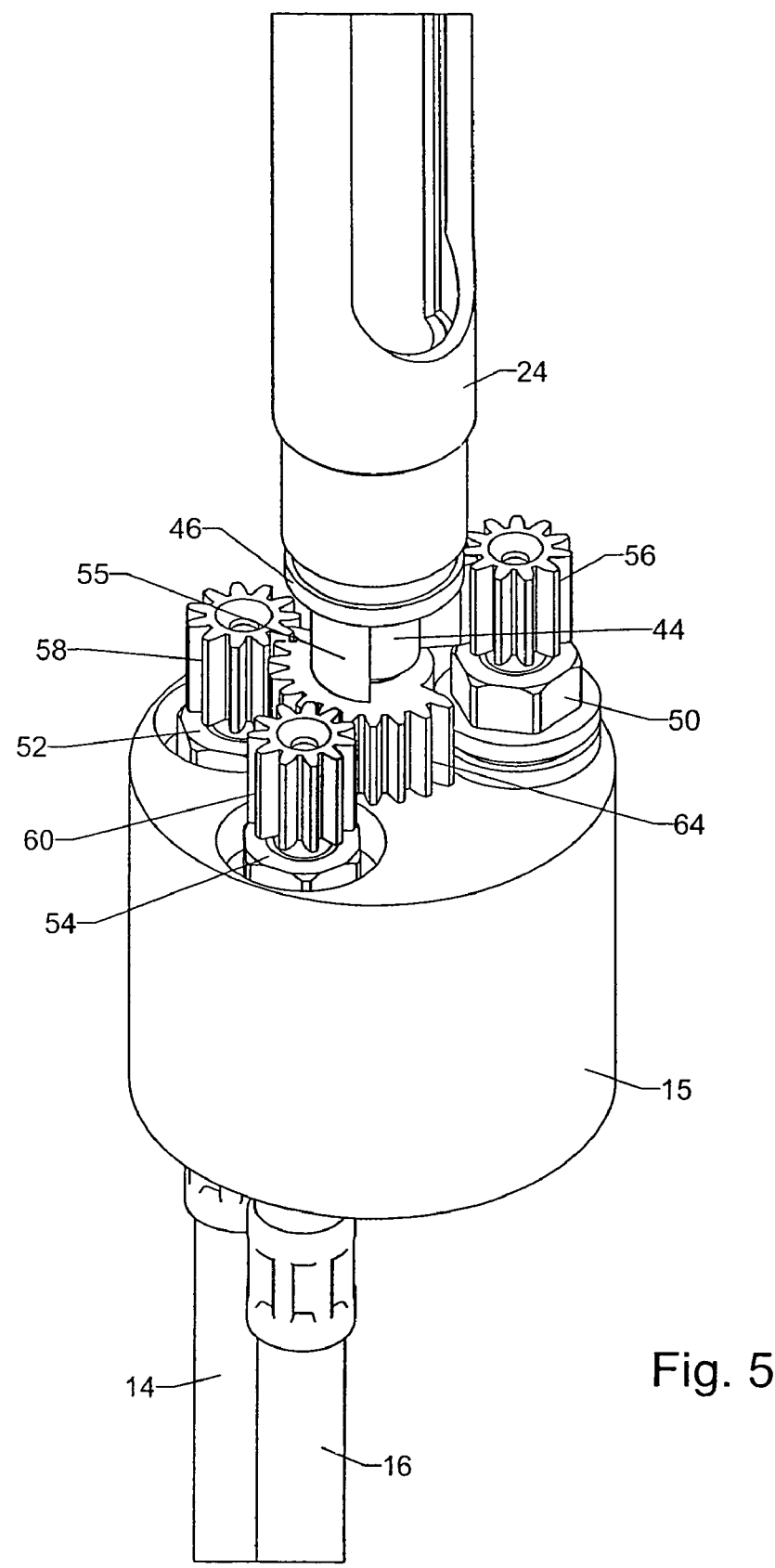
FIG. 5 is another perspective view of the interior of the mixing chamber housing of FIG. 1.

FIGS. 4 and 5 show the operative connections in the mixing chamber housing 12. The base of the housing contains three standard cartridge valves 50,52,54 of the ceramic plate type. As is conventional, each valve has an input in its base, and an output near the top, and flow through the cartridges controlled by a valve which is opened and closed by rotating a control lever which projects from the top of the valve. In the illustrated embodiment, gears 56,58,60 are mounted on and rotatable with the control levers of the cartridges. Inputs 14,16 are connected to the inputs of two of the cartridges 52,54. The gears 58,60 of these cartridges 52,54 are operably connected to a common set of teeth 64. This allows for the input cartridges to be controlled in a complementary fashion, i.e. the common set of teeth 64 rotate between two limits corresponding to 100% (full) supply from input 14 and 100% (full) supply from input 16. Between these limits the cartridges 52,54 are open/closed in a linear (i.e. constant) fashion so that the total input volume remains constant and only the mix ratio (proportion of input 14 to input 16) varies.

The outputs of the two cartridges 52,54 connected to the inputs 14,16 are both connected to the input of the third valve cartridge 50. Mixing of the fluids occurs at this point. The third valve cartridge 50 is operated to control the flow rate of mixed fluid out of the mixing chamber housing 12 (i.e. through output conduit 18). Thus, the set of teeth 62 which are operably connected to the gear 56 on the third valve cartridge 50 is arranged to move the gear between two limits corresponding to off, where no fluid flows through the cartridge (i.e. the valve is closed), and on, where the valve is fully open and maximum flow rate is achieved.

Figure 6:
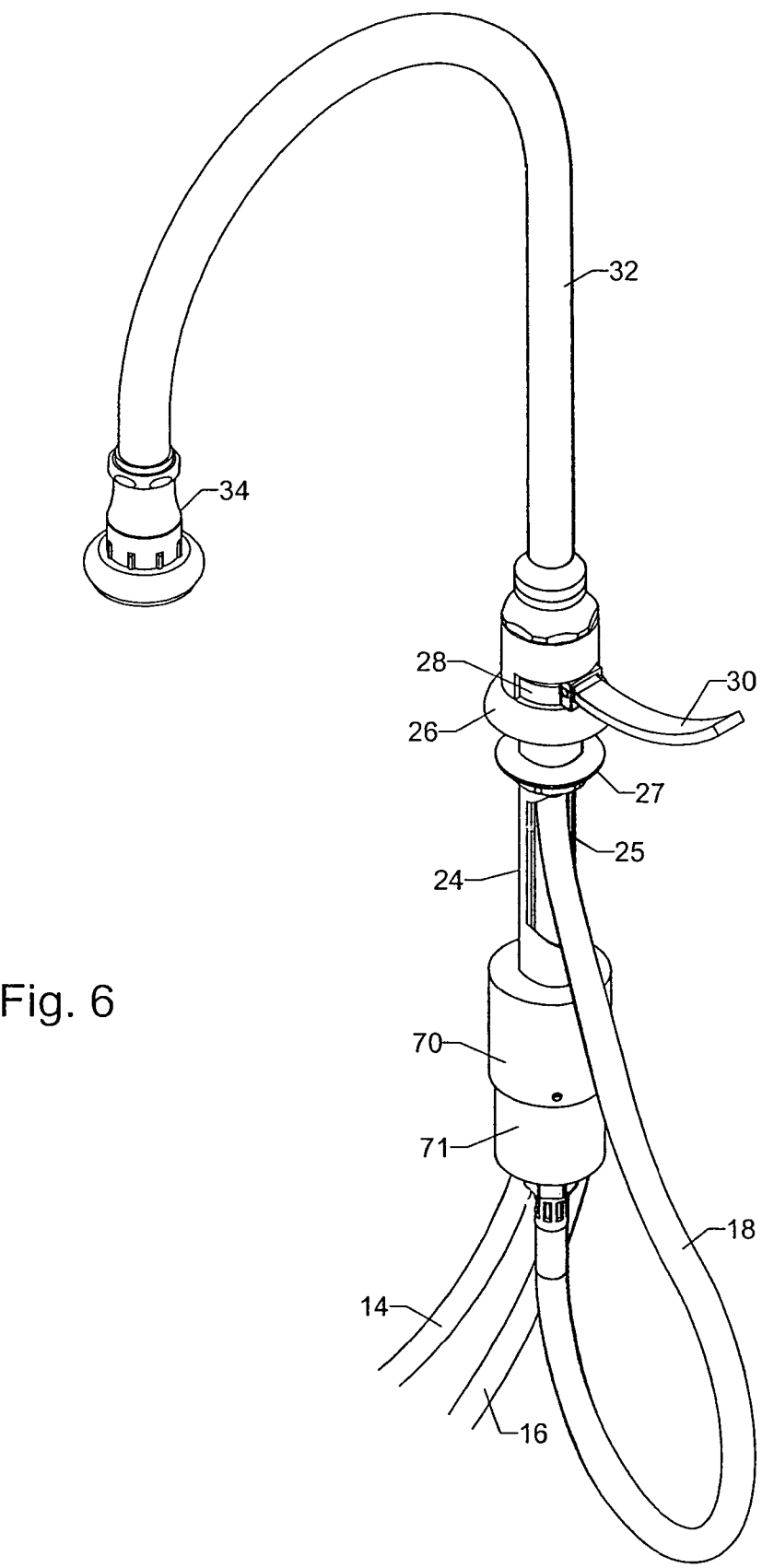
FIG. 6 is a perspective view of a tap assembly according to a second embodiment of the invention.
Figure 7:
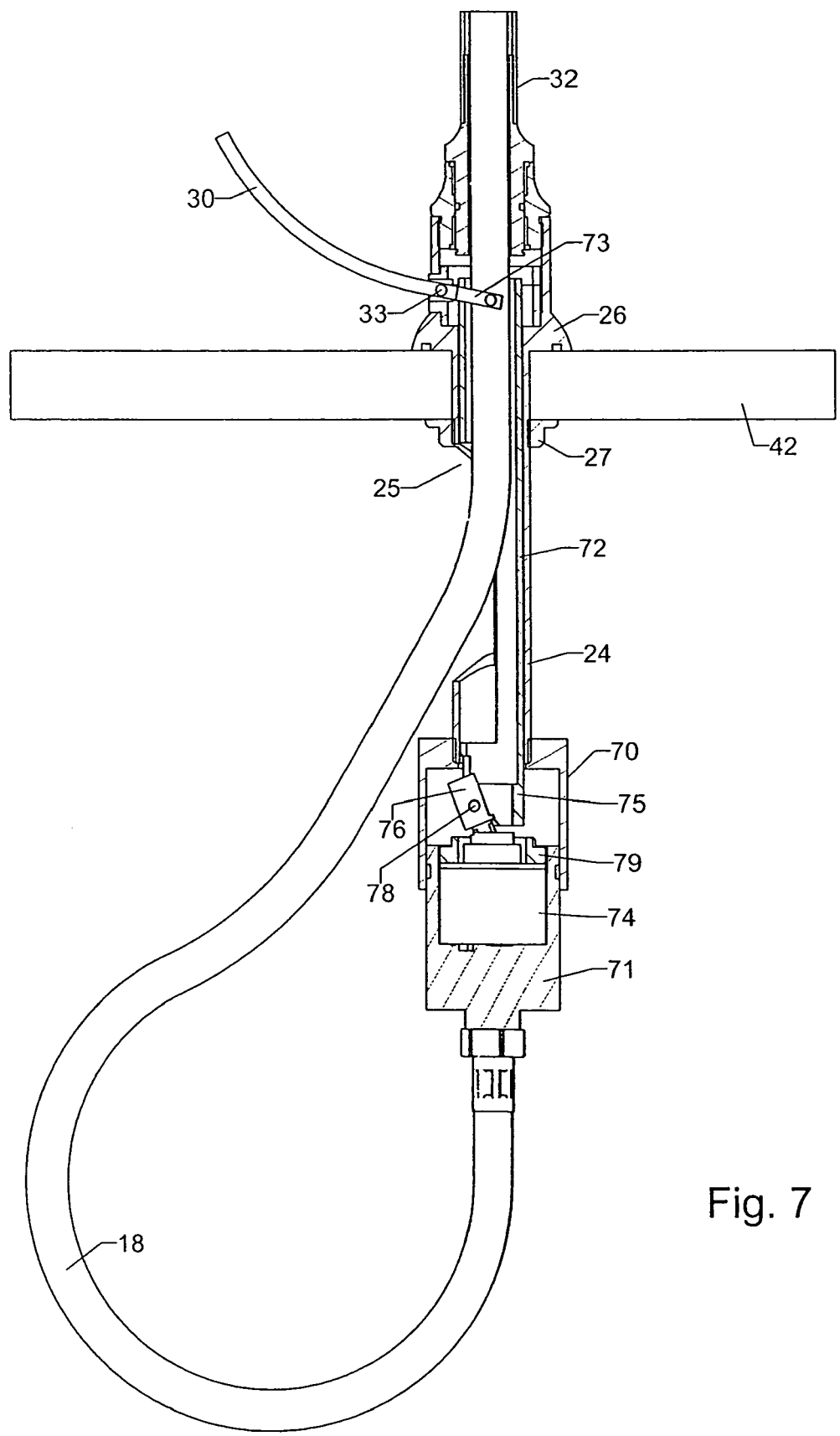
FIG. 7 is a first cross-sectional view of the tap assembly of FIG. 6, in an "on" configuration.
Figure 8:
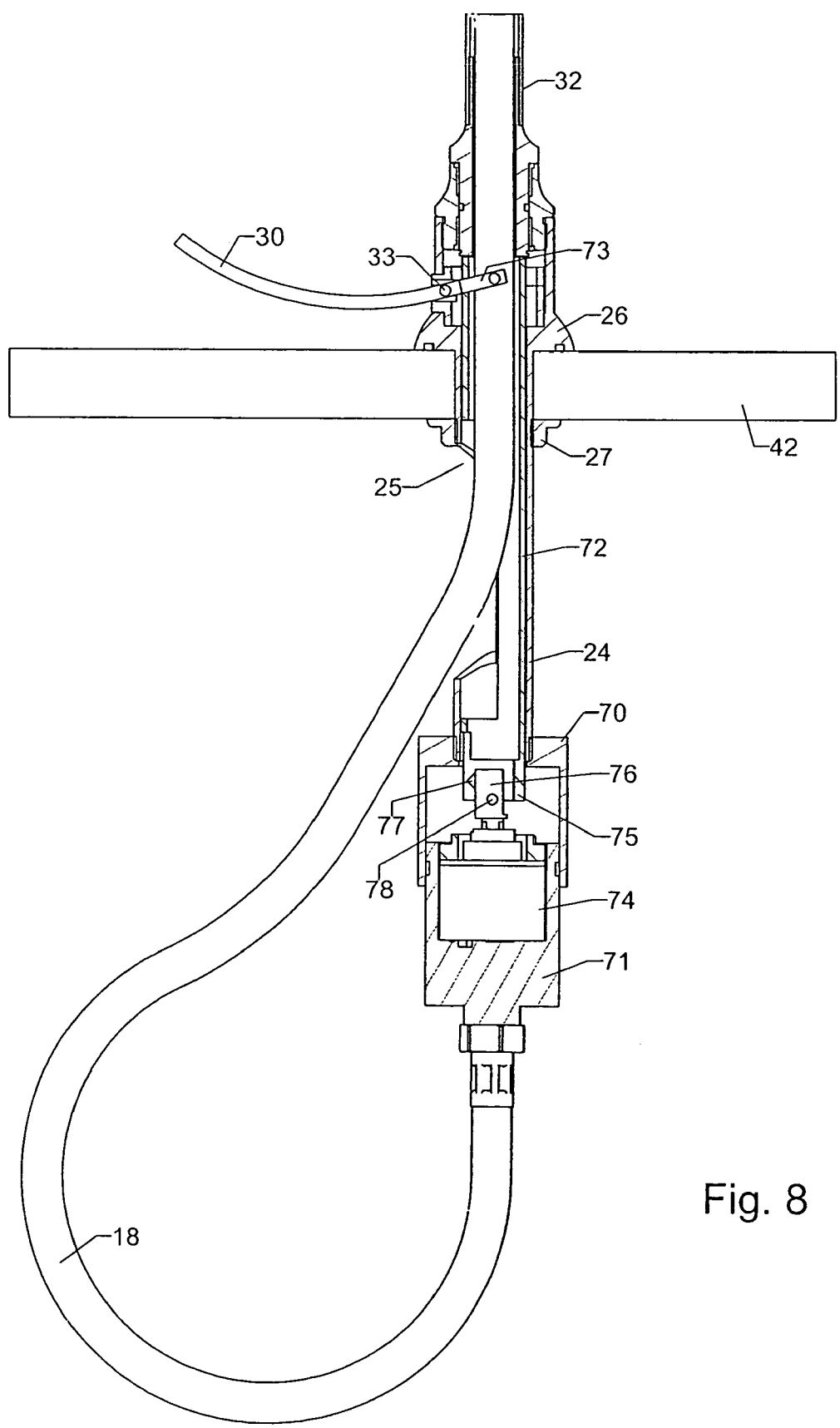
FIG. 8 is a second cross-sectional view of the tap assembly of FIG. 6, in an "off" configuration.

FIGS. 6 to 8 illustrate a second embodiment of the invention. Components which are the same as those illustrated in the first embodiment are given the same reference numerals and are not described again.

In the second embodiment, the three valve cartridges of the first embodiment are replaced by a conventional single lever-type mixer valve 74, which is sits in an outer housing 71, secured by a ring 79. The inputs 14,16 and output conduit 18 are connected to the outer housing 71, from where they are fed to the mixer valve 74. A lever 76 is manipulated to permit fluid from the inputs 14,16 to enter a mixing chamber (not shown) in the mixer valve 74 in variable proportions. This is achieved by rotating the lever 76. The same lever 76 is also tiltable to control the amount of fluid released from the mixer valve 74 into the output conduit 18.

The mixer valve 74 is operated using an actuator lever 30 that is mounted on the control housing 26 above the work surface 42. The actuator lever 30 is coupled to an upstanding sleeve 72 which extends between the control housing 26 and the mixer valve 74. The sleeve 72 is rotatable and axially slidable relative to the tube 24 connecting the control housing 26 and mixer valve 74. The actuator lever 30 is connected to the sleeve 72 via a V-shaped connector 73. The actuator lever is pivoted at a fulcrum 33 to enable the sleeve 72 to be pulled up and down. The lever 30 and fulcrum mechanism 33 are mounted on a rotatable ring 28, attached to the sleeve 72 so that the sleeve can be rotated by pushing the actuator lever 30.

FIGS. 7 and 8 show the connection between the control lever 76 of the mixer valve 74 and the base 75 of the sleeve 72. The control lever 76 is typically a box-like structure, and is contained within walls formed by the base of the sleeve 72 so that it is rotated with the sleeve 72. Outward projections 78 on the control lever 76 are received in slanted slots 77 in the walls that contain the lever 76. The slanted slots cause the lever to be tilted by the up and down movement of the sleeve 72. FIG. 7 shows an on configuration, where the sleeve 72 is at its lower position (actuator lever 30 pulled high) so that control lever 76 is tilted forward by the action of slot 77 against projection 78. FIG. 8 shows the off position with the sleeve 72 in its upper position (actuator lever 30 pushed down) where the control lever 76 stands upright.

As before, the sleeve 72 represents a physical control means connecting the actuator lever 30 with the mixer valve 74 and has a cut-out formed therein to enable the output conduit 18 to travel into the middle of tube 24, through the work surface 42 via the same hole as the tube 24 and sleeve 72 to enter the output spout 32.

A casing 70 attached the outer housing 71 to the tube 24 to prevent relative rotation therebetween, as described above. The casing 70 also protects the operative mechanism between the sleeve 72 and the control lever 76.

Figure 11:
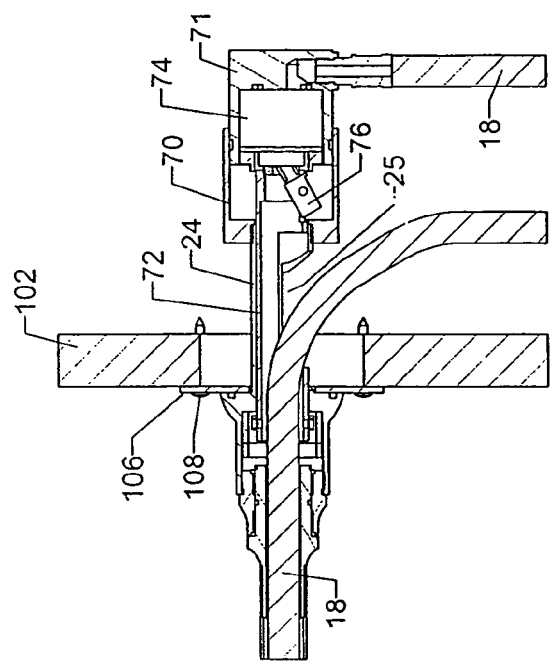
FIG. 11 is a cross-section taken along the line B-B in FIG. 10.
Figure 10:
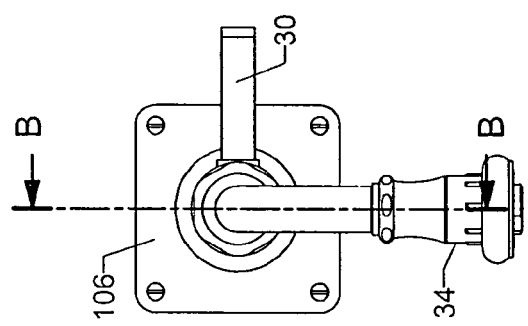
FIG. 10 is a front view of the tap assembly of FIG. 9.
Figure 9:
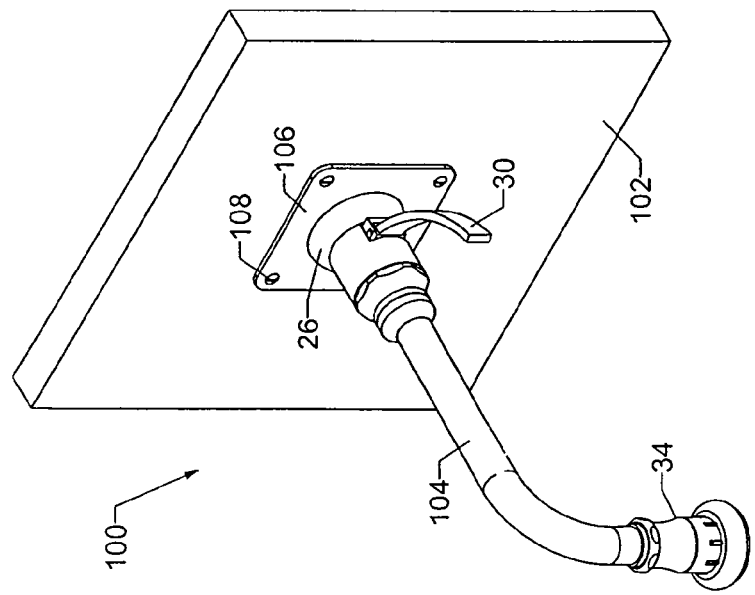
FIG. 9 is a perspective view of a tap assembly according to a third embodiment of the invention.

FIGS. 9 to 11 illustrate a third embodiment of the invention, where the work surface which hides the mixer valve (i.e. the work surface through which the output conduit passes) is a vertical wall 102, e.g. a stud wall for mounting in a kitchen or other suitable area. Again, parts in common with the first or second embodiments are given the same reference numbers.

In the tap assembly 100 of the third embodiment, the housing 26 includes a flat base plate 106 which can be mounted on the wall 102 using screws 108. The output conduit 18 enters the cut out 25 in the tube 24 behind the wall 102 and is therefore guided horizontally through the wall into a conventional spout 104 to terminate at spray head 34.

Similar to the second embodiment, the third embodiment uses the single lever mixer valve 74, but in this case, the valve 74 is held in a horizontal configuration, with the lever 76 extending substantially horizontally.

The inner control sleeve 72 is movable axially (horizontally) and rotatably by the control lever 30 on the housing 26 using the same mechanism as the second embodiment.

What is claimed is:

1. A mixer tap assembly having:
   a mounting apparatus for attaching the assembly to a work surface, the mounting apparatus having a bore therethrough;
   a mixing chamber positioned below the mounting apparatus;
   two inputs in fluid communication with the mixing chamber;

a fluid outlet positioned above the mounting apparatus, the fluid outlet located at the end of a spout;

an output conduit in fluid communication with the mixing chamber and suitable for carrying mixed fluid to the fluid outlet;

a mix controller operable to control the ratio of fluid received in the mixing chamber from the two inputs, the mix controller including a mix valve apparatus associated with the mixing chamber;

a mix actuator, being part of the mix controller, positioned above the mounting means; and a mix control apparatus communicable with the mix valve apparatus to perform the fluid input control;

wherein the mixing chamber is suitable for mixing fluid receivable from the two inputs;

the mix actuator is arranged to operate the mix control apparatus to perform the fluid input control; and the mix control apparatus and the output conduit pass through the bore in the mounting apparatus.

2. A mixer tap assembly according to claim 1, further having:

a flow controller operable to control fluid flow out of the mixing chamber into the output conduit, the flow controller including a flow valve apparatus associated with the mixing chamber;

a flow actuator, being part of the flow controller, positioned above the mounting means; and a flow control apparatus communicable with the mix valve apparatus to control the fluid flow out of the mixing chamber;

wherein the flow actuator is arranged to operate the flow control apparatus to control the fluid flow out of the mixing chamber; and wherein the flow control apparatus passes through the bore in the mounting apparatus.

3. A mixer tap assembly according to claim 1, wherein the output conduit is a flexible tube extending from the mixing chamber through the spout to the fluid outlet.

4. A mixer tap assembly according to claim 3, wherein the fluid outlet is detachably mounted to and extendable away from the end of the spout.

5. A mixer tap assembly according to claim 2, wherein the flow and mix control apparatuses are rotatable.

6. A mixer tap assembly according to claim 2, wherein the flow and mix control apparatuses are sleeves.

7. A mixer tap assembly according to claim 6, wherein the sleeves are arranged concentrically to each other.

8. A mixer tap assembly according to claim 6, wherein a portion of the output conduit is located in the interior of part of the sleeves.

9. A mixer tap assembly according to claim 8, wherein each sleeve includes an axially extending opening formed in a circumferential surface thereof through which a portion of the output conduit passes.

10. A mixer tap assembly according to claim 2, wherein the flow and mix control apparatuses are operably connected to their respective valves through a gear train.

11. A mixer tap assembly according to claim 2, wherein the flow and mix actuators include rotatable rings coupled to the flow and mix control apparatuses, respectively.

12. A mixer tap assembly according to claim 2, wherein the flow and mix controllers share a common flow and mix actuator.

13. A mixer tap assembly according to claim 12, wherein the flow and mix controllers share a common flow and mix control apparatus.

14. A mixer tap assembly according to claim 13, wherein the common flow and mix control apparatus is a sleeve, the sleeve being rotatable and moveable along the axis of such rotation.

15. A mixer tap assembly according to claim 1, arranged such that the mix control apparatus is connected to the mix valve apparatus associated with the mixing chamber such that actuation of the mix controller results in a change in the ratio of fluid from the two inputs into the mixing chamber while the total input flow rate into the mixing chamber from the two inputs is maintained.

16. A mixer tap assembly according to claim 1, wherein the fluid outlet is a spray head nozzle.

17. A tap and work surface assembly comprising:

a mixer tap assembly according to claim 1; and a work surface having a hole formed therethrough;

the mounting apparatus of the mixer tap assembly being attached to the work surface such that the bore of the mounting apparatus is aligned with the hole in the work surface;

wherein the mixing chamber is positioned below the work surface, and the fluid outlet and mix actuator are positioned on or above the work surface; and wherein the mix control apparatus and the output conduit pass through the hole in the work surface.

18. A tap and work surface assembly comprising:

a mixer tap assembly according to claim 2; and a work surface having a hole formed therethrough;

the mounting apparatus of the mixer tap assembly being attached to the work surface such that the bore of the mounting apparatus is aligned with the hole in the work surface;

wherein the mixing chamber is positioned below the work surface, and the fluid outlet, mix actuator and flow actuator are positioned on or above the work surface; and wherein the mix control apparatus, flow control apparatus and the output conduit pass through the hole in the work surface.

19. A method of assembling a tap and work surface assembly, the tap and work surface assembly comprising a mixer tap assembly according to claim 1 and a work surface with a hole formed therethrough, wherein the method comprises the steps of:

attaching the mixer tap assembly to the work surface via the mounting apparatus, such that the mixing chamber is positioned below the work surface, and the fluid outlet and mix actuator are positioned on or above the work surface; and arranging the mix control apparatus and output conduit such that they pass through the hole in the work surface.

20. A method of assembling a tap and work surface assembly, the tap and work surface assembly comprising a mixer tap assembly according to claim 2 and a work surface with a hole formed therethrough, wherein the method comprises the steps of:

attaching the mixer tap assembly to the work surface via the mounting apparatus, such that the mixing chamber is positioned below the work surface, and the fluid outlet, mix actuator and flow actuator are positioned on or above the work surface; and arranging the mix control apparatus, flow control apparatus and output conduit such that they pass through the hole in the work surface.

21. A kit of parts for a mixer tap assembly having:
- a mounting apparatus for attaching the assembly to a work surface, the mounting apparatus having a bore therethrough;
- a mixing chamber positionable below the mounting apparatus;
- two inputs in fluid communication with the mixing chamber;
  - a fluid outlet positionable above the mounting apparatus, the fluid outlet is locatable at the end of a spout;
  - an output conduit fluidly communicable with the mixing chamber and suitable for carrying mixed fluid to the fluid outlet;
  - a mix controller operable to control the ratio of fluid received in the mixing chamber from the two inputs, the mix controller including a mix valve apparatus associated with the mixing chamber;
- a mix actuator, being part of the mix controller, positionable above the mounting means; and
- a mix control apparatus communicable with the mix valve apparatus to perform the fluid input control;
- wherein the mixing chamber is suitable for mixing fluid receivable from the two inputs;
  - the mix actuator is arrangeable to operate the mix control apparatus to perform the fluid input control; and
  - the mix control apparatus and the output conduit are arrangeable to pass through the bore in the mounting apparatus.

22. A mixer tap assembly having:
- a mixing chamber mountable below a work surface;
- two inputs in fluid communication with the mixing chamber;
- a fluid outlet mountable on or above the work surface;
- an output conduit in fluid communication with the mixing chamber to carry mixed fluid to the fluid outlet;
- a flow controller operable to control fluid flow out of the mixing chamber into the output conduit;
- a flow actuator, being part of the flow controller, mountable on or above the work surface;
- a flow control apparatus communicable with the mixing chamber through the work surface;
- a mix controller operable to control fluid input received in the mixing chamber;
- a mix actuator, being part of the mix controller, mountable on or above the work surface; and
- a mix control apparatus communicable with the mixing chamber through the work surface; wherein:
- said mixing chamber is suitable for mixing fluid received from the two inputs;
- the flow actuator is arranged to operate the flow control apparatus to control fluid flow out of the mixing chamber;
- the mix actuator is arranged to operate the mix control apparatus to perform the fluid input control; and
- the flow control apparatus, mix control apparatus and output conduit are arranged to share a common path through the work surface.

23. A tap and work surface assembly comprising a mixer tap assembly according to claim 22 connected to a work surface, such that the mixing chamber is mounted below the work surface and the fluid outlet, flow actuator and mix actuator are mounted on or above the work surface,
- wherein the flow control apparatus, mix control apparatus and output conduit share a common path through the work surface.

24. A kit of parts for a mixer tap assembly having:
- a mixing chamber mountable below a work surface;
- two inputs in fluid communication with the mixing chamber;
  - a fluid outlet mountable on or above the work surface;
  - an output conduit fluidly communicable with the mixing chamber to carry mixed fluid to the fluid outlet;
  - a flow controller operable to control fluid flow out of the mixing chamber into the output conduit;
  - a flow actuator, being part of the flow controller, mountable on or above the work surface;
  - a flow control apparatus communicable with the mixing chamber through the work surface;
  - a mix controller operable to control fluid input received in the mixing chamber;
- a mix actuator, being part of the mix controller, mountable on or above the work surface; and
- a mix control apparatus communicable with the mixing chamber through the work surface; wherein:
  - said mixing chamber is suitable for mixing fluid received from the two inputs;
- the flow actuator is arrangeable to operate the flow control apparatus to control fluid flow out of the mixing chamber;
  - the mix actuator is arrangeable to operate the mix control apparatus to perform the fluid input control; and
  - the flow control apparatus, mix control apparatus and output conduit are arrangeable to share a common path through the work surface.

25. A method of assembling a tap and work surface assembly, said tap and work surface assembly being according to claim 23, wherein said method comprises the steps of:
- mounting the mixing chamber below the work surface;
- mounting the fluid outlet, flow actuator and mix actuator on or above the work surface; and
- arranging the flow control apparatus, mix control apparatus and output conduit such that they share a common path through the work surface.

* * * * *

UNITED STATES PATENT AND TRADEMARK OFFICE
CERTIFICATE OF CORRECTION

PATENT NO.      : 7,607,449 B2  
APPLICATION NO. : 11/496505  
DATED           : October 27, 2009  
INVENTOR(S)     : Herring et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Twelfth Day of October, 2010

David J. Kappos  
*Director of the United States Patent and Trademark Office*